United States Patent

[11] 3,616,231

| [72] | Inventors | Hans Ulrich Bergmeyer;<br>Waldemar Thum; Hans Mollering, all of<br>Tutzing, Germany |
|---|---|---|
| [21] | Appl. No. | 775,946 |
| [22] | Filed | Nov. 14, 1968 |
| [45] | Patented | Oct. 26, 1971 |
| [73] | Assignee | Boehringer Mannheim GmbH |

[54] PROCESS FOR THE PRODUCTION OF URICASE
15 Claims, No Drawings

[52] U.S. Cl. ................................................... 195/66
[51] Int. Cl. ..................................................... C07g 7/26
[50] Field of Search ........................................... 195/66

[56] References Cited
UNITED STATES PATENTS

| 3,431,176 | 3/1969 | Fukumoto et al............. | 195/66 |
| 3,475,276 | 10/1969 | Kano............................ | 195/66 |

OTHER REFERENCES

Mahler, H. R. in the Enzymes, Boyer et al. eds; Vol. 8, pp. 285–296 (1963)

*Primary Examiner*—Lionel M. Shapiro
*Attorney*—Burgess, Dinklage & Sprung

ABSTRACT: Process for isolating uricase from animal tissue such as liver, kidney and spleen comprising extracting the water-insoluble fraction of such a tissue homogenate with an alkaline salt solution, treating the extract containing the uricase with kieselguhr (diatomite), separating the kieselguhr having the uricase adsorbed thereon from the remaining solution, eluting the separated kieselguhr with an alkaline acetone solution, precipitating the uricase in the eluate with ammonium sulfate and purifying the recovered precipitate by washing the same at least once with water or water containing a minor amount of a salt.

PROCESS FOR THE PRODUCTION OF URICASE

The present invention relates to a process for producing uricase. More particularly the invention relates to a process for isolating uricase from animal tissue which is technically feasible.

Uricase (urate oxidase) is an oxidizing enzyme which catalyzes the reaction of uric acid to allantoin and is present in the kidneys and livers of most animals. Uricase is required for the enzymatic determination of uric acid in serum and urine using the procedure described by E. Pratorius and H. Paulsen, J. Clin. Lab. Invest. 3, 273 (1953). For this purpose an enzyme preparation is required which will have as low an inherent absorption as possible at 293 $\mu$. In recent years there has been a sudden increase in the demand for a pure uricase to meet this requirement in order that the determination of uric acid be reliable, and for the purpose of providing as rapid a determination as possible.

Uricase is obtained according to prior-art procedures from animal kidneys, spleen or liver mitochondria. Because of the higher enzyme content, the recovery procedures which use pig livers as the starting material are of particular practical importance. For example, Mahler, Hubscher and Baum, (J. Biol. Chem. 216, 652 (1955)) have isolated a highly active uricase having 10 U/mg. of protein from an acetone dried powder of pig liver mitochondria. This method is not, however, technically exploitable, as the preparation of the mitochondria is very expensive, and also because of the required centrifugation at more than 6,000 g. is only suitable for operation on a small scale. Furthermore, the 21 percent yield is too low.

Robbins, Barnett and Grant have described (J. Biol. Chem. 216, 27 (1955)) a process which comprises a fractionated fourfold extraction of the impurities from liver with water, phosphate buffer, sodium chloride and borate buffer, followed by extraction of the uricase derived from the fresh pig liver with strong glycine-carbonate buffer. In these procedures 50 percent of the enzyme is lost. Further, additional purification steps are required and include a pH precipitation, alcohol precipitation and alcohol fractionation procedures, another pH precipitation and salt extraction. An end product is thus obtained having an activity of only about 1 U/mg. This procedure also has the disadvantage that, in applying it on a technical scale, large centrifuges are needed, the purification of the product requires considerable time, and the procedure cannot be performed in batches of unlimited size. Furthermore, the purity of the enzyme (1 U/mg.) and the yield (35 percent) are unsatisfactory.

A process has also been described by Leone (Colowick-Kaplan METHODS OF ENZYMOLOGY, Vol. II, 485 (1953),) which results in a 29 percent yield of a product having a specific activity of 0.07 U/mg. The yield and purity of the enzyme are thus again very unsatisfactory.

The processes available heretofore are only laboratory procedures which are not suitable for technical manufacture. This is apparent, for example, from the fact that the commercial uricase preparations available up till now have had specific activities of between 0.0045 and 0,8 U/mg. (H.R. Mahler Hoppe-Seyler-Thier-felder, Thierfelder, Vol. VI, A, Enzyme, Part A, page 894 (1965).

It is an object of the present invention to provide a convenient process of preparing uricase.

Another object is to provide an improved process for the preparation of uricase which is economically and technically feasible.

A further object is to provide an improved process for the preparation of uricase of a high activity.

Other objects will be apparent hereinafter.

Acccording to the present invention the aforesaid objects may be achieved by a procedure wherein animal liver or kidneys, preferably pig liver, are subjected to a simple concentration procedure which on a technical scale provides products of high activity (approx. 7 U/mg.) in reproducible yields.

According to the present invention it has been found that uricase can be isolated from animal tissues, particularly liver, kidney or spleen, by extracting the water-insoluble fraction of such a tissue homogenate with an alkaline salt solution, treating the thusly obtained extract with kieselguhr, separating the kieselguhr having the uricase adsorbed thereon, eluting the uricase from the kieselguhr with an alkaline acetone solution, precipitating the enzyme present in the eluate with ammonium sulfate and purifying the recovered precipitate at least one time by extraction thereof with pure water or water containing a small amount of a salt.

In accordance with one preferred embodiment of the invention it has been found to be advantageous to dissolve the uricase thus obtained (which already has a specific activity greater than 1 U/mg.) in a dilute alkaline salt solution and to treat the same with calcium phosphate gel, whereupon the inherent absorption at 293 $\mu$ is further reduced. The supernatant liquid from the calcium phosphate gel treatment is then precipitated again with ammonium sulfate.

An important aspect of the process of the invention is the adsorption of the uricase onto kieselguhr e.g., Celite or Supercel). This binding to the kieselguhr takes place easily when the salt content of the solution is between 0.1 and 0.05 M. At lower salt concentrations, too much foreign protein is adsorbed, so that the purifying effect is substantially poorer, since some of the uricase then remains in the supernatant liquid. The adsorption onto the kieselguhr is carried out in the pH range of 6 to 8, preferably pH 6.7 to 7.3.

The elution of the uricase from the kieselguhr is conducted using an alkaline acetone solution. The acetone concentration in this instance amounts to between 20 and 35 percent, because at higher values acetone precipitates, and below 20 percent increasing amounts of foreign protein are also eluted. The most favorable acetone content depends in part on the pH value used, which in turn is related to the temperature to the extent that at lower temperature higher pH values can be used than can be employed at room temperature. The upper limit at room temperature, i.e., a temperature of about 20° C. is a pH 9.4, of 9.4, but at 0° C. it amounts to about 9.8. It is advantageous to carry out the elution above a pH of 8.0, as below this value the enzyme is no longer completely desorbed.

The use of kieselguhr for the clarification of solutions and improving filtration speed is well known to the prior art. The adsorption of amylase onto kieselguhr from filtrate of an Aspergillus culture has also been described.

The selective adsorption of an enzyme from a salt-containing tissue homogenate followed by elution with acetone, however, is an entirely new process, and is based on the surprising discovery of the fact that uricase in solution with may foreign protein contaminants is selectively adsorbed onto kieselguhr from a tissue homogenate, particularly a liver homogenate, which after neutralization has a high salt content. This makes it possible to filter such a homogenate and is the first time this has been realized. AS a result an extremely high degree of purification of the uricase adsorbed onto kieselguhr is obtained. It is also to be considered surprising that the uricase is desorbed with acetone solution in the alkaline range, this for the first time permitting rapid elution on a technical scale.

The step of washing the ammonium sulfate precipitate with pure water or water containing a slight amount of a salt, preferably with 0.05 M $KHCO_3$ solution having a pH of 8.5 is also very important to the results in accordance with the invention. It is desirable first to eliminate the acetone from the enzyme eluted with the acetone solution, by precipitation thereof by the addition of more acetone to provide an approximate acetone content of 60, percent and redissolution with alkaline salt solution before the ammonium sulfate precipitation is carried out. It is advantageous to carry out the dissolution with dilute alkali carbonate solution at a pH value of between 9 and 10.5, and preferably at a pH of 10.2. The acetone precipitation is not essential and may be omitted. It represents, however, the simplest method of removing the acetone.

For carrying out the ammonium sulfate precipitation, the salt concentration must amount to 1.6 M in order to achieve complete precipitation of the uricase. Higher ammonium sulfate concentrations are possible, but they offer no advantage. The precipitate obtained in the ammonium sulfate precipitation can be washed with water or dilute alkaline solutions, without the uricase going back into solution. This washing, which can be carried out repeatedly, permits the separation of substantially all of the foreign protein still present. For the extraction it is preferable to use a potassium bicarbonate solution, it being possible to use concentrations of up to 0.3 M without the dissolution of appreciable amounts of uricase taking place. The extraction is carried out preferably with 0.05 M $KHCO_3$ *solution*.

The precipitation with ammonium sulfate followed by extraction of foreign protein can be carried out repeatedly, and is preferably carried out at least twice, a treatment with calcium phosphate gel being interposed between the first and second ammonium sulfate precipitations. The calcium phosphate gel serves to remove colored contaminants which increase the blank, i.g., control value in the final optical determination.

The salting out of protein substances for isolation by ammonium sulfate is a well-known and widely used procedure. The washing out of protein precipitates of this sort, especially those of a crystalline nature, using weaker salt concentrations than are necessary for the precipitation of the protein, has also been described. However, the washing of an amorphous protein precipitate of the kind herein involved with water or with weakly alkaline salt solutions for removing large quantities of foreign protein has never previously been carried out.

It is preferable to use glycine-$Na_2CO_3$ buffered to a pH of 10.2 as the alkaline salt solution for the extraction of the water-insoluble fraction of the tissue homogenated. This buffer has been described by Robbins, et al. (supra), for the extraction of uricase, but in that instance a borate precipitate was involved.

The process of the invention permits the simple and technical isolation of uricase from tissue extracts with a yield of approximately 50 percent of the starting activity, and with a high degree of purity of about 7 U/mg. Starting from 30 kg. of pig liver, approximately 1.24 g. of uricase of this purity are obtained according to the invention. In the above-mentioned process of Mahler et al., (supra), only 2 mg. of uricase were isolated from 100 g. of acetone dry powder which, in turn, had been prepared from 2 kg. of fresh liver. For a 30 kg. batch, this corresponds to 0.3 g. of enzyme. In the process described in Biochim. Biophysica Acta 23 (1957) pp. 43 to 53, which also starts from liver mitochondria, the yield of uricase having a final purity of 6.95 U/mg., projected to 30 mg. of liver, amounts to 140 mg., which is little more than 10 percent of the yield obtained according to the invention. In the previously mentioned process proposed by Robbins, an enzyme having a final purity of 1 U/mg. is obtained in a yield of 35 percent. This latter process does not require the production of mitochondria, but on the other hand it requires the use of a fourfold centrifugation of the alkaline tissue extract at 4,000 g. In the case of a 30 kg. batch, this would require a centrifuging time alone amounting to 50 hours, using the largest centrifuge available provided this rating.

The invention is more particularly described and explained by means of the following example, which, however, is not intended to limit the scope of the invention.

EXAMPLE 30 kg. of pig liver were homogenized with 3 times its volume of desalted water. Water was then added to make a final volume of 200 liters and the pH adjusted to 5.3 with 2N acetic acid. 10 kg. of kieselguhr (Supercel, of John-Manville, U.S.A.) were then added, the mixture stirred for 10 minutes and filtered on a filter press. The resulting filter cake was washed with water and homogenized using 1.5 times its volume of 0.27 M $Na_2CO_3$ containing 0.1 M glycine and having a pH of 10.2 and the resulting batch brought to 0.4 M with solid ammonium sulfate. The pH of this homogenate was adjusted to pH value of 7.0 with 2N acetic acid, and water added to provide a final volume of 150 1. The mixture was stirred overnight at room temperature, and the dissolved uricase was at the same time selectively adsorbed onto kieselguhr. The mixture was thereafter filtered and washed with water. The filter cake was extracted in the cold with 75 1. of a solution of 0.2 M NaCl and 33 percent acetone having a ph of 9.2. As a result the uricase went into solution. The solution was filtered to clarity and washed with the above described acetone solution. The filtrate was then precipitated with acetone to 60 percent V/V and again filtered. The precipitate was recovered and extracted with 0.2 M $Na_2CO_3$ having a pH of 10.2, and then filtered free of insoluble components. The filtrate (approx. 8 1.) was saturated to 1.6 ammonium sulfate, and the precipitate resulting therefrom twice washed using 1.5 1 of 0.05 M $KHCO_3$ for each washing. The precipitate was dissolved with 0.2 M $Na_2CO_3$ 3 solution having a pH of 10.2 to provide a volume of 300 ml. The resulting solution was diluted 1:4 with completely desalted $H_2O$, and 300 ml. of calcium phosphate gel (approx. 20 ml. dry substance per ml.) were then added for the purpose of adsorbing any remaining colored substances. The uricase was precipitated from the supernatant liquid with ammonium sulfate and freed of residual foreign proteins by washing with 0.05 M $KHCO_3$. The washed precipitate was dissolved in glycine-$Na_2CO_3$ buffer and remains stable in this solution.

In table I a summary of the concentration process described above is set out. The yield of pure uricase (approx. 7 U/mg.) amounted to about 50 percent of the starting activity. The quotient of the pure enzyme 240-293 $\mu$ amounted to about 1.8.

TABLE I

Summary of concentration of uricase from 30 kg. pig liver according to the example

| Purification step | Volume in liters | Total protein in grams | Uricase total in units | Spec. activity in units per mg. of protein | Percent yield |
|---|---|---|---|---|---|
| Washing, pH 5.3 | 200 | 1,210 | (¹) | | |
| Extraction with 0.27 M $Na_2CO_3$ + 1.0 M glycine pH 10.2 | 45 | 901 | $1.2 \cdot 10^4$ | 0.0133 | |
| Filtrate and wash water pH 7.0 after adsorption of uricase on Supercel | 150 | 840 | $7.14 \cdot 10^2$ | 0.00085 | |
| Acetone-NaCl extract pH 9.2 | 75 | 157 | $1.5 \cdot 10^4$ | 0.096 | 100 |
| Acetone precipitation 60% precipitate | 8 | 58.5 | $1.43 \cdot 10^4$ | 0.245 | 95 |
| Ammonium sulfate precipitate 1.64 M after washing with 0.05 M $KHCO_3$ solution | 0.30 | 10.2 | $1.04 \cdot 10^4$ | 1.02 | 69.3 |
| Ca-phosphate gel adsorption, supernatant liquid | 1.5 | 3.7 | $1.02 \cdot 10^4$ | 2.76 | 68 |
| Ammonium sulfate precipitate after $KHCO_3$ washings, dissolved in a mixture of glycine and glycerine, pH 10.2 | 0.100 | 1.24 | $0.834 \cdot 10^4$ | 6.8 | 55.6 |

¹ No activity.

NOTE.—Extractable activity and quantity of protein are here influenced by the extractant and are not yet quantitatively comparable with the following values.

We claim:

1. Process of isolating uricase from animal tissue comprising the steps of:

a. extracting the water-insoluble fraction of an animal tissue homogenate with an alkaline salt solution,
   b. contacting the alkaline salt solution containing extracted uricase with kieselguhr whereby the uricase is adsorbed onto the kieselguhr,
   c. separating the kieselguhr having uricase adsorbed thereon and extracting this kieselguhr with alkaline acetone solution,
   d. treating the alkaline acetone extract with ammonium sulfate to precipitate the uricase present therein, and e. separating the thusly formed precipitate comprising uricase and extracting the same at least one time with a member selected from the group consisting of pure water and water containing a small amount of a salt to purify the same.

2. Process according to claim 1 wherein said tissue comprises at least one member of the group consisting of animal liver, kidney and spleen.

3. Process according to claim 1 which comprises effecting said contacting of the alkaline salt solution containing uricase with the kieselguhr of step (b) at a pH of between 6 and 8 and a salt concentration of between 0.1 and 0.5 M.

4. Process according to claim 2 which comprises effecting said contacting of the alkaline salt solution containing uricase with the kieselguhr of step (b) at a pH of 6.7 to 7.3 and a salt concentration of between 0.1 and 0.05 M.

5. Process according to claim 1 which comprises effecting said extracting of the kieselguhr having uricase adsorbed thereon with alkaline acetone solution of step (c) with an aqueous acetone solution containing 20 to 35 percent acetone and having a pH of 8.0 to 9.8.

6. Process according to claim 1 which comprises adjusting the alkaline acetone extract obtained in step (c) to an acetone concentration of about 60 percent to thereby precipitate the uricase from said extract, dissolving the uricase precipitate with an alkaline salt solution and thereafter treating the resulting solution with ammonium sulfate to precipitate the uricase present therein.

7. Process according to claim 6 wherein the dissolution of the uricase precipitate is carried out with a dilute alkali carbonate solution having a pH of from 9 to 10.5.

8. Process according to claim 6 wherein the dissolution of the uricase precipitate is carried out with a dilute alkali carbonate solution having a pH of 10.2.

9. Process according to claim 1 which comprises extracting the ammonium sulfate precipitate in step (e) with an 0.01 to 0.3 M potassium carbonate solution.

10. Process according to claim 1 which comprises extracting the ammonium sulfate precipitate in step (e) with an 0.05 M potassium carbonate solution.

11. Process according to claim 1 wherein the extraction of step (e) is carried out at least two times and wherein following said first extraction, the uricase precipitate is dissolved in an aqueous alkaline solution and the solution treated with solid calcium phosphate gel to remove any colored impurities, the uricase precipitated out of solution with ammonium sulfate and the precipitate subjected to a second extraction according to step (e).

12. Process according to claim 11 wherein said uricase precipitate following said first extraction is dissolved in 0.2 M $Na_2CO_3$ having a pH of 10.2.

13. Process according to claim 1 which comprises effecting the ammonium sulfate precipitation of step (d) with an ammonium salt concentration of 1.6 M.

14. Process according to claim 1 wherein said water-insoluble fraction of animal tissue homogenate is obtained by extracting homogenized animal tissue with aqueous glycine-$Na_2CO_3$ buffered to a pH of 10.2.

15. Process according to claim 1 wherein said animal tissue is pig liver.

PO-1050
(5/69)

UNITED STATES PATENT OFFICE
CERTIFICATE OF CORRECTION

Patent No. 3,616,231          Dated October 26, 1971

Inventor(s) Hans Ulrich Bergmeyer, Waldemar Thum, Hans Mollering

It is certified that error appears in the above-identified patent and that said Letters Patent are hereby corrected as shown below:

Col. 1, line 50 (Spec. p. 3, line 15)
"")," should be --)),--

Col. 2, line 37 (Spec. p. 5, line 22)
Delete "9.4," (first occurrence)

Col. 2, line 47 (Spec. p. 6, line 6)
"may" should be --many--

Col. 2, line 53 (Spec. p. 6, line 11)
"AS" should be --As--

Col. 2, line 65 (Spec. p. 6, line 21)
Delete comma after "60"

Col. 5, line 17 (Spec. p. 13, line 4, Claim 4)
"0.05" should be --0.5--

Signed and sealed this 18th day of April 1972.

(SEAL)
Attest:

EDWARD M. FLETCHER, JR.
Attesting Officer

ROBERT GOTTSCHALK
Commissioner of Patents